United States Patent [19]

Tung et al.

[11] Patent Number: 5,077,338
[45] Date of Patent: Dec. 31, 1991

[54] USING A SOLVENT FOR IN-SITU FORMATION OF FIBERS IN AN ELASTOMER

[75] Inventors: William C. T. Tung; Deborah A. Tung, both of Tallmadge; Mellis M. Kelley, Douglas D. Callander, both of Akron, Richard G. Bauer, Kent, all of Ohio

[73] Assignee: The Goodyear Tire & Rubber Company, Akron, Ohio

[21] Appl. No.: 571,483

[22] Filed: Aug. 23, 1990

[51] Int. Cl.$^5$ ................................................ C08F 8/00
[52] U.S. Cl. ..................................... 525/165; 524/37; 524/39; 524/41; 525/146; 525/152; 525/177; 525/178; 525/180; 525/184
[58] Field of Search ............................. 524/37, 39, 41; 525/146, 152, 165, 177, 178, 180, 184

[56] References Cited

U.S. PATENT DOCUMENTS

| | | |
|---|---|---|
| 3,005,795 | 10/1961 | Busse et al. ........................ 525/146 |
| 3,062,702 | 11/1962 | Parrish et al. ........................ 525/178 |
| 3,474,050 | 10/1969 | Chappelear et al. ................ 525/146 |
| 4,263,184 | 4/1981 | Leo et al. . |
| 4,328,133 | 5/1982 | Ogawa et al. . |
| 4,543,377 | 9/1985 | Crossman . |
| 4,842,933 | 6/1989 | Cizmecioglu . |

*Primary Examiner*—Paul R. Michl
*Assistant Examiner*—Edward J. Cain
*Attorney, Agent, or Firm*—David E. Wheeler

[57] ABSTRACT

A method of preparing a fiber reinforced elastomer by forming fibers therein in-situ and an elastomer made thereby are provided. In the method, a fiber forming material, preferably a high performance polymer, is dissolved in a compatible solvent to form a solvent-/polymer mixture, and the mixture is added to the elastomer during compounding or mixing. The polymer is quickly dispersed into the elastomer, and the solvent rapidly evaporates. The shear of the mixer causes elongation of the polymer into fibers. The fibers may also be oriented by the shear of the mixer.

5 Claims, No Drawings

USING A SOLVENT FOR IN-SITU FORMATION OF FIBERS IN AN ELASTOMER

BACKGROUND OF THE INVENTION

The invention relates to a method of preparing a fiber reinforced elastomer by the in-situ formation of fibers therein, and a reinforced elastomer made by the method.

The use of short fiber reinforced elastomers in the preparation of many products is known in the art. Prior art fiber reinforced elastomers are prepared using various methods of dry blending crystalline fibers into an elastomer, melt blending thermoplastic polymers into an elastomer, or forming fibers in an elastomer by reacting fiber forming ingredients in the elastomer. For example, see U.S. Pat. Nos. 4,263,184 and 4,833,191.

Dry blending fibers into an elastomer is difficult, and the friction caused by dry blending (if not carefully monitored) can cause overheating and degradation of the elastomer during mixing. Also, melt blending is limited in that thermoplastic polymers with a melting point above the degradation temperature of the elastomer cannot be used.

There is a need in the art for a method of introducing high performance polymers which have a high melting point (greater than 200° C.) or a high glass transition temperature (greater than 150° C.) into an elastomer in fibrous form. By high performance polymer it is meant a polymer with good mechanical properties and heat stability. It is an object of the present invention to provide such a method.

Other objects of the invention will be apparent from the following description and claims.

SUMMARY OF THE INVENTION

A method of forming high performance polymer fibers in-situ in an elastomer is provided. The method comprises the steps of at least partially dissolving the high performance polymer in a solvent to provide a solvent/polymer mixture (or solution), adding the mixture to a hot elastomer in a mixer, using the shear of the mixer to form said high performance polymer into fibrous reinforcement particles during mixing, and evaporating or stripping the solvent from the elastomer at rubber mixing temperatures. The fiber forming polymer may comprise a high melting thermoplastic or a polymer having a high glass transition temperature (Tg). Preferably, the polymer will comprise about 5–30% by weight of the solvent/polymer mixture.

Also provided is a fiber reinforced elastomer made by the method of the invention. The reinforced elastomer of the invention demonstrates a 10–150% improvement in modulus over a control compound made without fibers, the improvement in modulus being substantially in proportion to the fiber content.

DETAILED DESCRIPTION OF THE INVENTION

In the method of the invention, a high performance polymer is mixed with solvent to form a solvent/polymer mixture. Separately, an elastomer (e.g. rubber) is compounded in a conventional Brabender mixer in a conventional manner. The solvent/polymer mixture is added to the elastomer in the mixer during mixing or compounding, and very quickly is homogeneously dispersed therein. The temperature of the rubber during compounding, generally about 142° F. to 392° F., quickly causes the solvent to evaporate, permitting the polymer to coalesce in the elastomer. The evaporated solvent is stripped (vented) from the mixture by conventional means (e.g. a hood or vacuum exhaust system). The shear of the mixer causes elongation of the coalesced polymer into fiber form and may provide some orientation of the fiber.

The fiber forming polymer of the invention may comprise a high performance polymer such as a high melting thermoplastic or a polymer having a high glass transition temperature. Examples of such polymers include polyphenylene oxide, polyester, polyarylate, polycarbonate, polyetherimide, polyamide, cellulose acetate, cellulose acetate butyrate, and mixtures thereof. The solvent used can be any solvent or plasticizer which is compatible with a particular polymer and may comprise methyl ethyl ketone, chloroform, acetone, methylene chloride and mixtures thereof, and mixtures of such solvents with other polar solvents such as methanol and dimethyl formamide.

Elastomers that can be used in the method include any elastomer that can be blended in the conventional mixing equipment. Examples of such elastomers are polyisoprene, natural rubber, ethylene propylene rubber, butyl rubber, halobutyl rubber, nitrile rubber, polybutadiene rubber, polystyrene butadiene rubber, etc.

The invention is further illustrated with reference to the following examples.

EXAMPLE 1

A 10% solution of polyphenylene oxide (PPO), in chloroform was slowly added to 45 g of poly cis 1,4 isoprene in a Brabender at about 140° C. The sample was mixed for five minutes and discharged. The discharged elastomer contained 8.7 phr PPO. The fiber containing elastomer was used for further compounding as follows.

|    | Ingredient | Chemical Name | Type | Amount in phr |
|----|------------|---------------|------|---------------|
| 1. | Duvalic or Natsyn | cis,1,4-polyisoprene | elastomer | 100 |
| 2. | pig 779 | carbon black | filler | 45 |
| 3. | Sardine | petroleum process oil | plasticizer | 9 |
| 4. | Zonflax | N-phenyl-N'-(1,3 dimethyl/butyl) N-phenyl-P-phenylenediamine | antidegradant | 2 |
| 5. | Nailax | diaryl-P-phenylene diamine | antidegradant | 1 |
| 6. | Sunolite | paraffinic/micro crystalline wax | processing aid | 1 |
| 7. | Sterax | stearic acid | activator | 3 |

BRABENDER COMPOUNDING

The high performance polymers (e.g. PPO) were added on top of the 100 parts of elastomer as described above. A Brabender mix at 70 rpm, using a 120° C. oil bath, was used for non-productives (ingredients 1–7). Mix time was 5 minutes, and the drop temperature was approximately 270° F.

The non-productive mixes were used for further compounding by reloading the non-productives in the mixer and adding the following ingredients.

| Ingredient | Chemical Name | Type | Amount in phr |
|---|---|---|---|
| 8. pig 1 | zinc oxide | activator | 3 |
| 9. sponbax | 2(morpholino-thio) benzenethiazole | accelerator | 0.8 |
| 10. phenax | N,N' diphenyl guanidine | accelerator | 0.4 |
| 11. pig 4 | sulfur | vulcanizing agent | 1.6 |

Productive mixes (non-productive plus the accelerators and vulcanizing agents (ingredients 8–11)) were carried out without external heating at 50 rpm for 3 minutes. The compounded elastomers were cured at 150° C. The vulcanizate physical properties of the reinforced elastomer (Natsyn or Duvalic) were compared to that of a control compound comprising the above formulation prepared without the addition of a fiber reinforcing polymer.

Upon testing the compound of the invention for certain physical properties, it was determined that the elastomer composition made according to the invention showed improvements over a control compound (without fibers) as follows:

| | % tensile modulus improvement over control |
|---|---|
| at 50% elongation | 87% |
| at 100% elongation | 129% |
| at 200% elongation | 104% |
| at 300% elongation | 48% |

EXAMPLE 2

25 g of cellulose acetate butyrate was dissolved in 200 ml of mixed solvent (4:1/acetone : methanol). The solution was slowly added to 200 g of poly(cis-1,4-isoprene) in a Brabender set at 125° C. and 40 RPM. The mixing was done in five minutes. The resultant elastomer was compounded according to the formula described in Example 1. The cured sample has an improved tensile modulus over a non-fibrous control as follows:

| | % tensile modulus improvement over control |
|---|---|
| at 50% elongation | 43% |
| at 100% elongation | 26% |
| at 200% elongation | 40% |
| at 300% elongation | 17.6% |

EXAMPLE 3

A 20% solution of polyphenylene oxide (PPO) in chloroform was slowly added to poly(cis-1,4-polyisoprene) in a Brabender at about 140° C. The sample was mixed for 5 minutes and discharged. The elastomer contained 9 phr PPO. The resultant elastomer was compounded using the compound formulation described in Example 1. The vulcanizate physical properties showed an improvement of tensile modulus as follows:

| | % tensile modulus improvement over control |
|---|---|
| at 50% elongation | 97% |
| at 100% elongation | 103% |
| at 200% elongation | 66% |
| at 300% elongation | 50% |

While specific embodiments of the invention have been illustrated and described, those skilled in the art will recognize that the invention may be variously modified and practiced without departing from the spirit of the invention. The invention is limited only by the following claims.

What is claimed is:

1. A method for forming polymer fibers in-situ in an elastomer comprising the steps of:
   (a) at least partially dissolving said polymer in a solvent to provide a polymer/solvent mixture;
   (b) adding said mixture to a hot elastomer during compounding thereof in a mixer;
   (c) using the shear of the mixer to form said polymer into fibers during mixing; and
   (d) evaporating and stripping said solvent at rubber mixing temperatures.

2. The method of claim 1 comprising the step of selecting said polymer to be a high melting thermoplastic.

3. The method of claim 1 comprising the step of selecting said polymer to be a polymer having a high glass transition temperature.

4. The method of claim 1 comprising the step of selecting said polymer from the group consisting of polyphenylene oxide, polyesters, polyetherimide, polyamide, cellulose acetate, cellulose acetate butyrate, polycarbonate, and mixtures thereof.

5. The method of claim 1 comprising the step of preparing a polymer/solvent mixture to comprise 5–30% by weight polymer.

* * * * *